US008259578B2

(12) United States Patent
Briscoe et al.

(10) Patent No.: US 8,259,578 B2
(45) Date of Patent: Sep. 4, 2012

(54) MONITORING NETWORKS

(75) Inventors: Robert J Briscoe, Woodbridge (GB); Arnaud Jacquet, Ipswich (GB)

(73) Assignee: British Telecommunications, London (GB)

( * ) Notice: Subject to any disclaimer, the term of this patent is extended or adjusted under 35 U.S.C. 154(b) by 557 days.

(21) Appl. No.: 12/306,361

(22) PCT Filed: Jun. 26, 2007

(86) PCT No.: PCT/GB2007/002397
§ 371 (c)(1), (2), (4) Date: Dec. 23, 2008

(87) PCT Pub. No.: WO2008/001081
PCT Pub. Date: Jan. 3, 2008

(65) Prior Publication Data
US 2009/0279433 A1 Nov. 12, 2009

(30) Foreign Application Priority Data
Jun. 26, 2006 (EP) .................................... 06253317

(51) Int. Cl.
*H04L 12/26* (2006.01)
(52) U.S. Cl. ........................................ 370/235; 370/253
(58) Field of Classification Search .................. 370/230, 370/232, 235, 406
See application file for complete search history.

(56) References Cited

U.S. PATENT DOCUMENTS

| 7,215,639 | B2 * | 5/2007 | De Maria et al. | 370/235 |
|---|---|---|---|---|
| 7,609,705 | B2 * | 10/2009 | Wakumoto et al. | 370/406 |
| 7,782,774 | B2 * | 8/2010 | Cheriton | 370/232 |
| 7,817,543 | B2 * | 10/2010 | Beshai et al. | 370/230 |

FOREIGN PATENT DOCUMENTS

| WO | 99/65184 | 12/1999 |
|---|---|---|
| WO | 2005/096566 | 10/2005 |
| WO | 2005/109783 | 11/2005 |

OTHER PUBLICATIONS

European Search Report dated Dec. 15, 2006 in EP 06253317.9.
Briscoe, "Emulating Border Flow Policing Using Re-ECN on Bulk Data", IETF Standard-Working-Draft, Internet Engineering Task Force, CH, Feb. 27, 2006, XP015043316.
Briscoe, "Policing Congestion Response in an Internetwork Using Re-Feedback", SIGCOMM' 05, Online, Aug. 26, 2005, pp. 277-288, XP002450828.

(Continued)

*Primary Examiner* — Anh-Vu Ly
*Assistant Examiner* — Gbemileke Onamuti
(74) *Attorney, Agent, or Firm* — Nixon & Vanderhye P.C.

(57) ABSTRACT

Methods and systems for determining a correction factor for use in monitoring network traffic, said network traffic comprising a plurality of flows of data units, each flow having associated therewith a flow identifier, said data units having associated therewith a path characterization metric; the method comprising the steps of: selecting a subset of flow identifiers from the overall set of flow identifiers; determining, in respect of flows having associated therewith flow identifiers from said selected subset of flow identifiers, which flows if any are persistently irregular flows; determining a first measure of the total of the accumulated path characterization metrics associated with data units of said selected subset of flows; determining a second measure indicative of the proportion of said total measure contributed by said persistently irregular flows; and determining a correction factor in dependence on the first and second measures.

23 Claims, 4 Drawing Sheets

OTHER PUBLICATIONS

Briscoe, B. et al., "Shared Control of Networks using Re-feedback; An Outline," BT Technical Report TR-CXR9-2004-001 (Sep. 2004), http://www.cs.ucl.ac.uk/staff/bbriscoe/projects/refb/refb__fdna04.pdf.

Briscoe, B. et al., "Commercial Models for IP Quality of Service Interconnect," BTT J (May 18, 2005), http://www.cs.ucl.ac.uk/staff/bbriscoe/projects/ipe2eqos/gqs/papers/ixqos__bttj05.pdf.

Jacquet, et al., "A Path-Aware Rate Policer: Design and Comparative Evaluation," BT Technical Report TR-CXR9-2005-006 (Oct. 2005), http://www.cs.ucl.ac.uk/staff/B.Briscoe/projects/2020comms/refb/policer-nsdi06.pdf.

International Search Report for PCT/GB2007/002397, mailed Sep. 27, 2007.

* cited by examiner

MONITORING NETWORKS

This application is the U.S. national phase of International Application No. PCT/GB2007/002397 filed 26 Jun. 2007 which designated the U.S. and claims priority to European Application No. 06253317.9, filed 26 Jun. 2006 the entire contents of each of which are hereby incorporated by reference.

TECHNICAL FIELD

The present invention relates to methods and systems for monitoring networks, for example data networks such as the Internet. In particular, embodiments of the present invention relate to methods and systems for determining a correction factor which may be used in monitoring network traffic traversing a network. Embodiments of the present invention also relate to methods and systems for controlling a capability of a network.

BACKGROUND TO THE INVENTION AND PRIOR ART

Characterising the paths through a network is a basic capability that lies beneath routing, congestion control and provision of differentiated quality of service. Networks can be layered on top of other networks, but path characterisation is useful at any layer, whether the network consists of Ethernet switches, Internet Protocol (IP) routers, or general purpose computers arranged in what is often called an overlay network, such as a peer-to-peer network. In each case, a unicast path through a network is the sequence of forwarding nodes and links between a sending end-node and a receiving end-node. The path between any two end-nodes is determined by the routing system.

Characterisation of a network path involves taking some measure of the combined effect of all the forwarding nodes and links on the path. For instance, the propagation delay of a network path is the sum of all the propagation delays of each link. Similarly, the hop count of the path is the sum of how many nodes forward data on the path. Or the congestion along a path is the combination of the congestion at each node or link along the path. Congestion is typically defined as the probability of the offered load not being served, so the way to combine a number of congestion metrics into a congestion metric that characterises the path is to take the combinatorial probability of congestion at every node on the path.

Given there are a huge number of possible paths through a network, an efficient way to characterise any particular path is for the nodes on the path to solely characterise their local contribution to each path metric. Then, as they forward data, they combine their local contribution to the path metric into each unit of data as they forward it (whether frames or packets, etc). They must use the appropriate function for combining their local characterisation with the characterisation accumulated so far in the data being forwarded.

For instance, if the characterisation of propagation delay is required, a field in the header of each packet may be standardised in order to carry a value representing propagation delay. Then each node can add its local characterisation of propagation delay to the value arriving in the header and replace the result in the header as the new value to be forwarded to the next node. In this way each value in each data header accumulates the path's propagation delay as it traverses the path. Equivalently, each forwarding node could subtract rather than add its local characterisation from the value in each header. As long as the combining function chosen was standardised and appropriate, the headers of data packets would accumulate the characterisation of the path used by the data.

An appropriate combining function for congestion is that for combinatorial probability. For instance, if the value of congestion arriving at forwarding node j in a data header is $h_j$, and the local characterisation of congestion is $m_j$, then the node should forward data with the value of the combinatorial probability of both $h_{(j+1)} = 1-(1-h_j)(1-m_j)$. This example illustrates that each characteristic of a network path must be combined into the header at each forwarding node using the combining function appropriate to the metric concerned.

The above general technique for characterising each path through a network only allows the receiving end-node to see the characterisation of the complete path. Stated more generally, the technique allows each node on the path to characterise the path traversed so far—its upstream path. However, frequent, timely path characterisation is most useful to the sending end-node, not the receiver. More generally a frequent, timely characterisation of the remaining downstream path would be much more useful to each forwarding node on the path than a characterisation of the upstream path already traversed. With frequent, timely information about the remaining path about to be traversed by each packet, the sending node, and each forwarding node would be able to make timely decisions to control how much data they sent and on which path.

A prior patent application filed by the present applicant and published as WO2005/096566 proposed that each sending end-node could arrange to initialise each path characterisation value in each data header so that, on average, after the same process of accumulating each forwarding node's local characterisation of the path, the value in each data header would end up at a known target value by the time it reached the receiver. The particular target value to aim for would need to be well-known and standardised everywhere, typically zero.

As a consequence of this initial value set by the sender, each data header arriving at each forwarding node would carry a value characterising its remaining downstream path, at least on average. The sender could determine the best initial value for each data header using feedback about the whole path from the receiving node. The sender will, in effect, be continuously declaring the expected characterisation of the path within the packet headers of the data it sends into the path. When a paper relating to this invention was subsequently published [Briscoe05a] the term "re-feedback" was coined for the process of re-inserting feedback from the receiver back into the forward data path.

Once each data packet carries the expected characterisation of its remaining path through the network, network forwarding nodes can use this information to control their operation. This network control might conflict with an individual sender's self-interest. For instance, if the header value characterises congestion on the downstream path, the network may wish to limit the rate that data can be sent into such a congested path by some pre-agreed formula. This is an example of a case where the individual's self-interest is at odds with the general good of other users of the network, so the network may wish to police the rate allowed for each user to meet some wider objective, such as fairness. Such a policing function was described in another patent application filed by the present applicant and having application number PCT/GB2006/000417. However, as soon as forwarding nodes try to use the information the individual sender gives them against the sender's own interests, it would seem likely that the individual sender will be tempted to falsify the information.

Some possible scenarios resulting from cheating are shown in FIG. 1. In the lower half of the figure, a sender $S_1$ (labelled 10) is shown sending data to a receiver $R_1$ (labelled 16) over a route through networks $N_1$, $N_2$ and $N_4$ (labelled 11, 12 and 14 respectively) chosen from a wider selection of networks additionally including networks $N_3$ and $N_5$ (labelled 13 and 15 respectively) by the routing protocol. Aligned with this view of the path through the internetwork is a plot of downstream path congestion in one possible packet traversing the path. Alternatively, the same plots could represent the average of the path characterisation metrics in a flow of packets along the path. Of course, downstream congestion is just one possible path characterisation metric that could be illustrated.

It can be seen that, as the packet traverses the path of network elements 18, those that are congested reduce the path characterisation value in the packet's header by an amount associated with their local congestion. It will noted that there will usually be several network elements 18 within each network, but for simplicity only those at an entry or an exit point of each network are shown. Any of the network elements may have an associated step-change in the graph in the upper half of FIG. 1.

Five possible scenarios are illustrated in the upper part of the figure, labelled a-e. In scenario (a) the source initialises the header value correctly so that it arrives at the destination $R_1$ set to the target value zero. In this case, at each point on the path the value in the header then correctly represents downstream congestion from that point to the destination. But in scenario (b), the source has not initialised the header value to a sufficiently high value, so it undershoots the target just before the destination, somewhere within network $N_4$. Each subsequent scenario c-e shows the source initialising the header value to progressively lower values, so that in scenario (c) the packet becomes negative in network $N_2$, in scenario (d) it becomes negative in network N1 and in scenario (e) it is negative when it is initialised, so it is never positive in any network.

A further patent application filed by the present applicant and published as WO2005/109783 proposed a function at the egress of a network to test whether the sender was indeed initialising header values so that, on average, they reached the agreed constant value at the destination, and to sanction any flows that appeared to be understating their path's characterisation, for instance by dropping a commensurate proportion of the data. We generally call these functions that test metric validity 'dropping functions' even though sanctions short of dropping may be chosen in practice, such as packet truncation or even triggering off-line sanctions such as invoking penalty clauses in contracts.

We collectively call the above policing functions and dropping functions 'incentive mechanisms', because it can be shown that sanctions against traffic not declaring truthful path metrics can be arranged so that the sender's most successful strategy will be to honestly declare the characterisation of the path. However, the sender will only adopt such an honest strategy if it is actually trying to send information to a receiver. But not all potential senders conform to this stereotype. There may be malicious parties who are willing to send traffic into the network merely to disrupt other people, irrespective of whether they have any useful information to send, or anyone to send it to. For senders with such malicious motives, there will be no incentive to declare the path metric honestly when sending such dummy traffic. Taking the congestion path metric as an example, such a malicious sender is likely to declare a very low or even zero level of congestion on the path, in order that any rate policer using the congestion information will allow it to send as fast as possible.

Such dummy data from a malicious sender may well be dropped at the egress of the network, or earlier, because its initially declared characterisation of path congestion will have been insufficient to remain above the target level once decremented along the path. However, it may well have still caused problems earlier in the network, before being dropped. It may be the sender's objective to cause problems within the network, rather than to reach a destination across the network. Embodiments of the present invention aim to prevent these problems.

We said that characterising the paths through a network is a basic capability that lies beneath routing, congestion control and provision of differentiated quality of service. Many of these uses of path characterisation take the sum of the characterisations of many paths over time. This is particularly so within a network and between networks, where aggregate traffic is handled, rather than single flows. The sum can be used to determine an average, or to determine the total effect that one network has on another.

However, any flows of traffic from dishonest senders will pollute such aggregate sums, because they do not truly reflect the characteristics of the downstream paths they claim to reflect.

Without loss of generality, we will make the following discussion more concrete by assuming that it has been arranged that a numerically higher path characterisation is treated less favourably by the network, and its target value is zero. Therefore, it will be in the interest of a malicious sender to understate the path characteristic, and such data will eventually undershoot the zero target somewhere within the network. Therefore we can say that the flows that are of concern are those for which the lifetime balance has become persistently negative. It may be that not all data packets in the flow carry negative values, but when all the header values of all the packets within such flows are considered as a whole, the sum effect is negative. We will call these 'persistently negative flows'.

One particularly serious example of the damaging effect of persistently negative flows is the case where networks might agree to use the sum of path characterisations as the metric by which one network penalises the other if it has failed to deliver an agreed quality of service. Such a metric might further be used by one network to compare the qualities of routes through two different networks and from time to time to change its choice of routing to ensure it uses the best quality or cheapest downstream network. If the sum is polluted by persistently negative flows, the decisions made based on the sum may be incorrect. Indeed, it may even be in a malicious network's interest to create dummy traffic in order to pollute the sum, so that a neighbouring network makes a decision to the malicious network's advantage.

A specific example of this problem is where the characterisations of downstream congestion are summed together in all traffic crossing the border between two networks. This sum should represent the penalty that the upstream network should be made to suffer for all the congestion it has allowed its users to cause in downstream networks. Two networks might agree that the upstream network should keep this sum below a certain threshold, or perhaps multiple thresholds will be set, each with an increasing penalty if they are exceeded. Or, more generally, the upstream network may agree to pay the downstream network a charge proportional to the sum. In all these cases, the penalty will be understated if persistently negative flows are included in the sum. And if the penalty is understated, the upstream network may be encouraged to continue to allow malicious senders to understate congestion path metrics. Or indeed, the upstream network may be encouraged to create its own dummy traffic with persistently negative header values and send it into a neighbouring network to reduce the overall sum used to determine penalties it must suffer, by offsetting the positive values in other flows with the negative values in its dummy traffic.

REFERENCES

[Briscoe05a] Bob Briscoe, Arnaud Jacquet, Carla Di Cairano-Gilfedder, Alessandro Salvatori, Andrea Soppera and Martin Koyabe (BT), "Policing Congestion Response in an Internetwork Using Re-Feedback," In: Proc. ACM SIGCOMM'05, Computer Communication Review 35 (4) pp. 277-288 (August, 2005). DOI: http://doi.acm.org/10.1145/1080091.1080124

The most relevant prior disclosures known to the applicant are the applicant's own publications on the subject of re-feedback, including the above referenced patent applications (WO2005/096566, and WO2005/109783) and academic paper [Briscoe05a] as well as standards submissions [Briscoe05j] [Briscoe06a] and further academic papers and technical reports [Briscoe04c] [Briscoe05f] [Jacquet05] as well as a further patent application (WO/2005/096567).

Other researchers have often tried to attack the published re-feedback mechanisms, but few of these attacks are published and only one of these attempts has been relevant to the particular problem identified here. This concerted attempt to attack the previously published aspects of the re-feedback protocol has itself been published and presented by Steven Bauer, who identifies a general, but not the specific problem that embodiments of this invention aim to solve. Bauer highlighted the problem of senders with motivations other than to send information to receivers [see Bauer05 and Bauer06 for example]. As with all of the other publications above, these do not identify exactly what the best problem to solve is, or how to solve it.

Finally, an older patent application filed by the present applicant and published as WO/1999/065184 may be tangentially relevant to the present invention. This covered the idea of random sampling of traffic measurements used for charging so that one party to a contract covering traffic measurements could check on the readings of the other without having to account for all the traffic.

REFERENCES

[Bauer05] Steven Bauer, "Incentive Misalignment under Congestion-Based Pricing", Presentation to member-only consortium on Web (password protected) (November, 2005). <http://cfp.mit.edu/groups/broadband/secure/docs/Steven_Bauer_11-05.pdf>

[Bauer06] Steven Bauer, Peyman Faratin and Robert Beverly, "Assessing the assumptions underlying mechanism design for the Internet", In Proc First Workshop on Economics of Networked Systems (NetEcon06). <http://www.cs.duke.edu/nicl/netecon06/papers/ne06-assessing.pdf>

[Briscoe04c] Bob Briscoe, Sébastien Cazalet, Andrea Soppera and Arnaud Jacquet, "Shared Control of Networks using Re-feedback; An Outline", BT Technical Report TR-CXR9-2004-001 (September 2004).

[Briscoe05f] Bob Briscoe and Steve Rudkin, "Commercial Models for IP Quality of Service Interconnect" In: BTTJ 23 (2) pp. 171-195 (April, 2005).

[Jacquet05] Arnaud Jacquet, Bob Briscoe and Alessandro Salvatori "A Path-Aware Rate Policer: Design and Comparative Evaluation" BT Technical Report TR-CXR9-2005-006 (October, 2005)

[Briscoe05j] Bob Briscoe, Arnaud Jacquet and Alessandro Salvatori, "Re-ECN: Adding Accountability for Causing Congestion to TCP/IP," Internet Engineering Task Force Internet Draft (March, 2006): http://tools.ietf.org/id/draft-briscoe-tsvwg-re-ecn-tcp-01.txt

[Briscoe06a] Bob Briscoe (BT) "Emulating Border Flow Policing Using Re-ECN on Bulk Data" Internet Engineering Task Force Internet Draft (February, 2006): http://tools.ietf.org/id/draft-briscoe-tsvwq-re-ecn-border-cheat-00.txt

SUMMARY OF THE INVENTION

According to a first aspect of the present invention, there is provided a method of determining a correction factor for use in monitoring network traffic traversing a network, said network traffic comprising a plurality of flows of data units, each of said flows having associated therewith a flow identifier from a set of flow identifiers, said data units having associated therewith a path characterisation metric; said method comprising the steps of:

selecting a subset of flow identifiers from said set of flow identifiers;

determining, in respect of flows having associated therewith flow identifiers from said selected subset of flow identifiers, which flows if any are of a first type and which flows if any are of a second type in dependence on an accumulated measure of the path characterisation metrics associated with data units of said flows, flows being determined to be of a first type in the event that their respective accumulated measure is within a first range, and flows being determined to be of a second type in the event that their respective accumulated measure is within a second range;

determining a first measure of the total of the accumulated path characterisation metrics associated with data units of said selected subset of flows; and determining a second measure indicative of the proportion of said first measure contributed by flows of said second type; and determining a correction factor in dependence on the first and second measures.

Also according to the first aspect, there is provided an for determining a correction factor for use in monitoring network traffic traversing a network, said network traffic comprising a plurality of flows of data units, each of said flows having associated therewith a flow identifier from a set of flow identifiers, said data units having associated therewith a path characterisation metric; said apparatus comprising:

means for selecting a subset of flow identifiers from said set of flow identifiers;

means for determining, in respect of flows having associated therewith flow identifiers from said selected subset of flow identifiers, which flows if any are of a first type and which flows if any are of a second type in dependence on an accumulated measure of the path characterisation metrics associated with data units of said flows, such that flows are determined to be of a first type in the event that their respective accumulated measure is within a first range, and flows are determined to be of a second type in the event that their respective accumulated measure is within a second range;

means for determining a first measure of the total of the accumulated path characterisation metrics associated with data units of said selected subset of flows; and means for determining a second measure indicative of the proportion of said first measure contributed by flows of said second type; and means for determining a correction factor in dependence on the first and second measures.

According to preferred embodiments, the path characterisation metric may be a metric indicative of a characteristic of a downstream path, but according to alternative embodiments, it may be a metric indicative of a characteristic of an upstream path, or a metric indicative of a characteristic of an end-to-end path. Other possibilities are that it may be a metric indicative of a characteristic of the relevant network, or a part thereof.

The path characterisation metric may be a metric indicative of downstream, upstream or end-to-end congestion, or it may be a metric indicative of delay, number of hops, capability of network elements, or other such factors.

It will be noted that the step of determining the second measure may comprise determining the measure "directly". Alternatively, using an assumption that flows can be deemed either to be of a first type (e.g. persistently irregular over a time period in question) or of a second type (e.g. not persistently irregular over a time period in question), the second measure may be derived "indirectly", by first determining the proportion of the first measure contributed by flows of the first type, then deriving the proportion of the first measure contributed by flows of the second type therefrom.

The data units may be data packets, frames, messages or software objects, for example.

According to a second aspect of the present invention, there is provided a method of controlling a capability of a network using a correction factor determined in accordance with a method according to the first aspect, comprising controlling the capability in dependence on the correction factor.

Also according to the second aspect, there is provided apparatus for controlling a capability of a network using a correction factor determined in accordance with a method according to the first aspect, the apparatus comprising means for controlling said capability in dependence on said correction factor.

The capability may relate to policing congestion control, routing, or the provision of differentiated quality of service, for example.

Underlying preferred embodiments of the present invention is the realisation that an aggregate of path characteristics excluding those in persistently irregular flows is best found by finding an unbiased estimate of the sum of all the header values in all the persistently irregular flows, rather than merely trying to remove as many of these polluting values as possible from the sum.

For the avoidance of doubt, it is worth pointing out at this stage that the meaning of the word "irregular" in the context of the above is the meaning corresponding more closely to the words "unexpected" or "dishonest", rather than to words such as "jagged" or "arrhythmic". It will thus be understood that the expression "persistently irregular behaviour" encompasses various types of malicious, accidental or uncontrolled behaviours even if these follow a pattern and are entirely repetitive. Such patterns may be intentionally and systematically abusive.

Usually, characterising irregular flows can be done by determining whether a suitable measure falls outside an acceptable range. In the case of the re-feedback framework described earlier, the measure may therefore be the lifetime balance of the downstream congestion metric and the range may consist of positive values, which means that "persistently irregular" flows are indeed "persistently negative" flows.

It will therefore be noted that terms such as 'negative flow' are used often in relation to flows of a type which are likely to be deemed to be 'irregular', in particular in later sections of this description relating in detail to preferred embodiments of the invention using the re-feedback framework, but that this not intended to be limiting—this is done merely in order to simplify the description of those embodiments of the invention. It will be understood that this is generally applicable in relation to situations wherein a path characterisation metric usually has a positive value, or should have a positive value, and wherein a negative value is likely to be indicative of dishonest, malicious, accidental or uncontrolled behaviour, or other such behaviour which may be detrimental to the network, or to other network users in general. It is of course possible for the reverse situation to be true, and for path characterisation metrics usually to have a negative value, in which case appositive value is likely to be indicative of dishonest, malicious, accidental, uncontrolled, or other such behaviour which may be to the detriment of the network, or of other network users in general. In view of this, the more general term "persistently irregular flows" is used. In the context of preferred embodiments of the present invention, a "persistently irregular flow" could thus be defined as "a flow with an accumulated aggregate downstream path characterisation persistently outside expected bounds as delineated by the generally agreed target value for the system in question". The expression may of course need to be defined differently, but in a corresponding manner, in respect of other embodiments of the invention. Even more generally, therefore, embodiments of the invention are applicable in relation to situations in which flows are determined to be of a "first type" (for example, not persistently irregular) or of a "second type" (for example, persistently irregular), the determination being made in dependence on an accumulated measure of the path characterisation metrics associated with the data units of those flows.

Persistently irregular flows (or "negative flows" in preferred embodiments in which positive values are deemed to be indicative of 'good', 'honest' or 'fair' behaviour) cause two related detrimental effects: i) they pollute the sum over all flows and ii) if allowed to continue through the network they consume resources even though their negativity proves they have been sent maliciously. The distinguishing insight behind preferred embodiments of the invention is that the ability to be able to secure the re-feedback framework in order to simplify provision of routing, congestion control or differentiated quality of service depends on it not being possible to pervert the data on which the incentive mechanisms rely. Actually removing the offending traffic is also important, but whether this is completely successful is not so critical.

Therefore, it is at least as important to ensure that a sum taken over all flows does not account for any negative flows at all, as it is to be able to actually remove all the data carried in negative flows from the system. This is because incentive mechanisms rely on the sum itself not being polluted by persistently negative flows, irrespective of whether negative flows can be removed.

All the above disclosures identify the larger problem of malicious senders being willing to send traffic irrespective of whether it will be delivered. They also identify the more specific problem that persistently negative flows are a problem that will pollute the sum taken over an aggregate of flows. But they do not identify that a useful way to deal with the problem is to remove the sum of all the header values in all the persistently negative flows by finding an unbiased estimate, rather than merely trying to remove as many of the polluting values as possible.

For instance, a technique is suggested in [Briscoe05a] that breaks the summing procedure down into time-slots, each still measuring the sum of all flows over that duration and it removes any slots with a negative sum. But this still allows persistently negative flows to hide beneath a greater sum of positive flows during each timeslot, so that usually no compensation at all will be made for the persistently negative flows.

Also, another attempt to solve the problem was suggested in [Briscoe05a] where a function at the egress of the network detected negative flows (as already discussed with reference to WO2005/109783) and passed hints upstream to droppers on other network elements within the network in order to allow them to identify which flows were persistently negative and sanction them earlier upstream. This was suggested because the function for sanctioning negative flows required per-flow state, which was considered cost-effective at the last egress of the network, but not on interior routers.

However, unlike embodiments of the present invention, the interior routers could not compensate for the traffic in a negative flow that had already been transmitted before a hint arrived. Also, the mechanism was only feasible for detecting more seriously negative flows. The hints had to be sent widely to many upstream nodes not just towards the source address that the negative flow appeared to be sent from. This was because a cheating source sending data without any interest in communicating with anyone else could spoof any source address it wished to use, because it would not require anyone to reply. As transmitting and processing these hints would clearly consume potentially large amounts of network resources, it was proposed that a network element should not be required to read the hints nor to act on them unless it had sufficient resources.

This solution also improves significantly on common sampling techniques. Indeed, in order to improve the measure of the aggregate downstream path characterisation, it is not enough simply to pick packets at random and examine the path characterisation metric they carry. It is not enough even merely to examine subsequent packets of the same flow as well. It is actually necessary to take into account all packets of the flows, from the time they started, until the time they end.

It is believed that no prior disclosures have identified a solution to this problem. Other scenarios may exist where a technique is required that removes only that data from a large bulk of data that has some characteristic that falls below (or above) a set threshold. For instance, intrusion detection systems have this goal, as do systems for detecting unsolicited e-mail (spam). However, the goal of such systems is to remove as much of the offending data as possible, not to accurately measure how much of the offending data is (and was) present. In particular, when these systems are operated in real time on streams of related data, they do not attempt to measure how much of the data in a stream had already been sent before it was detected.

Also underpinning embodiments of the present invention is the identification of a mechanism to estimate the sum of all path characterisations excluding those in persistently negative (i.e. or more generally, irregular) flows, but without having to keep account of each flow separately.

It would seem that an accurate and useful approach to determine the sum of the path characterisations in many packets across many flows would be to accumulate the sum of each flow separately, then discard the sums of those flows that are numerically negative and sum only the remainder. However, this would require detecting the start and end of every flow of packets, and holding a balance separately for every flow. Even though the amount of memory required to record the balance of each flow is small, the memory required to store the flow identifiers is relatively large. For instance, with v4 of the Internet protocol a flow is identified by a 5-tuple of source and destination IP address (2×32b), source and destination port number (2×16b) and the protocol ID (8b), making 104b in all. Although storing and matching against per-flow state would be feasible for small numbers of flows, such a procedure becomes expensive in terms of the sheer volume of processing and memory required when handling very large numbers of flows. The problem of accounting for every flow becomes particularly acute when a large proportion of the flows are very short, in the extreme flows consisting of single packets, which is a characteristic of much traffic between computers. Indeed, if a malicious attacker knows that a network is accounting for every flow, it can send single packets with uncorrelated flow identifiers, in order to quickly exhaust the memory resources of the accounting system.

Preferred embodiments of the present invention select a truly random sample to give a good estimator for the sum of all path characterisations in persistently negative flows, but without having to measure every flow.

Note that [Briscoe06a] discloses a random selection mechanism for detecting highly negative flows, but it is not for the same purpose as the present invention, and it would not solve the present problem. It merely finds the most strongly negative flows, in order to detect anomalies which may be due to system misconfigurations or attacks. But the random selection mechanism in [Briscoe06a] cannot provide an unbiased estimate of the sum of all the flows excluding all the negative ones, which is the purpose of embodiments of the present invention. To achieve this, a measurement system like that of [Briscoe06a] would have to be able to travel back in time once it had detected a persistently negative flow, in order to compensate for the negative sum of that flow before it was detected. Embodiments of the present invention allow for compensation to be made for persistently negative flows without having to detect every negative flow and they make sure that those flows they do detect are detected from the very start.

BRIEF DESCRIPTION OF THE DRAWINGS

Preferred embodiments of the present invention will now be described with reference to the appended drawings, in which.

DESCRIPTION OF THE EMBODIMENTS

Figure 1:
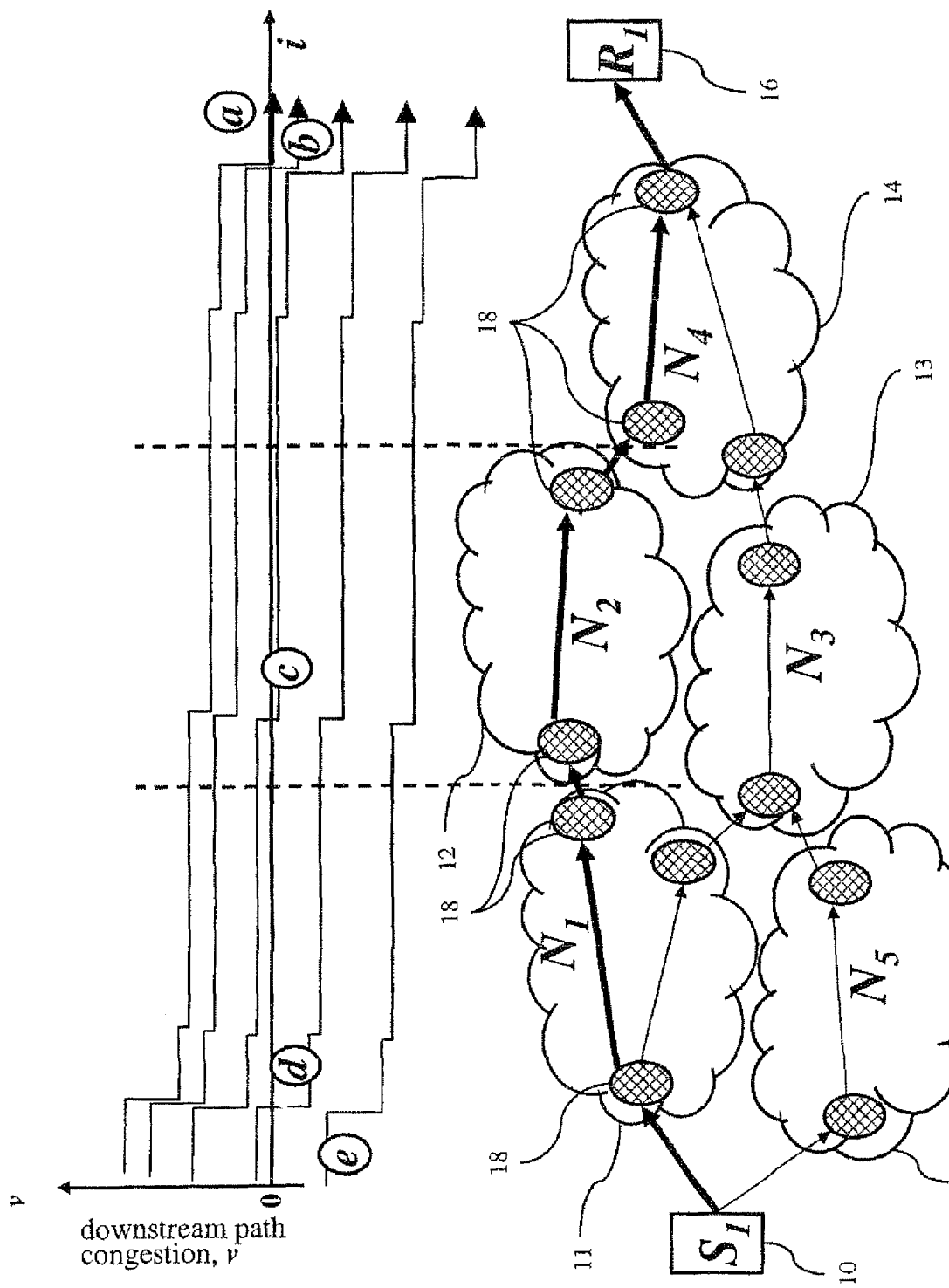
FIG. 1 illustrates some possible scenarios resulting from a "cheating" party providing dishonest or incorrect path characterisation metrics to one or more other parties on a network path.

The re-feedback framework [Briscoe05a] is designed to make it extremely simple to measure the sum of path characterisations at a network node, such as a border between networks.

For instance, taking congestion as the metric, to measure the volume of downstream congestion V passing through a network node over a potentially long period of time such as a month, the following formula suffices, $$V = \Sigma s_i h_i, \qquad (1)$$

where $s_i$ is the size of each packet (indexed by i) and $h_i$ is the header value for congestion in that packet. Note that the index i is merely used here for notational convenience to distinguish between packets; packets do not actually carry the index i in their headers.

In one proposed future embodiment of the re-feedback protocol, these congestion header values were considered to be represented as real numbers (to some degree of precision) in a multibit field in the data packet header. But a version of congestion re-feedback called re-ECN has also been proposed [Briscoe05j] that will fit in the extremely limited number of available bits in the current Internet Protocol (IP) version 4 header. In this re-ECN proposal, congestion values $h_i$ can only take the values −1, 0 or +1.

Therefore, to measure the volume of downstream congestion passing through a network node, all that would be necessary to implement equation (1) would be to count the volume of packets marked +1 (termed positive packets) and subtract the volume of those marked −1 (termed negative packets). This technique was originally proposed in [Briscoe05a]. We call techniques like this one naïve techniques, because they do not exclude persistently negative flows.

Note that the precise details of which bits of a packet header are used for which of these three header values, or whether a few discrete integers or many discrete integers are used to improve the precision of representing header values, are not necessary to be able to understand the invention. It will be sufficient to consider the header values $h_i$ merely as real numbers represented to some precision.

In order to remove the polluting effect of persistently negative flows, the invention uses per-flow state for a small but truly random sample of the traffic crossing a border. For instance, to meter the bulk congestion volume passing from an upstream network to a downstream neighbour, the sum metered using the naïve technique can be inflated by the proportion of excess negative bytes found in persistently negative flows in the sample. The process involves the following steps:
 (1) the formula for inflating the congestion volume
 (2) a random sampling mechanism
 (3) a process for neighbouring networks to agree on the inflated measurement The third step is only necessary if the measurement is intended to be used to meter some value that regulates the interconnection arrangements between two networks or between a network and a customer. This process would typically be agreed beforehand in the contract between them.

To be concrete, and without loss of generality, in the following we take the path characterisation metric being measured to be a metric indicative of downstream congestion, having a target threshold of zero, wherein the network reduces the header value when congestion is experienced. Thus we are trying to exclude the measurements from all flows where the sum of all header values is less than zero.

Congestion Volume Inflation Formula

Figure 2:
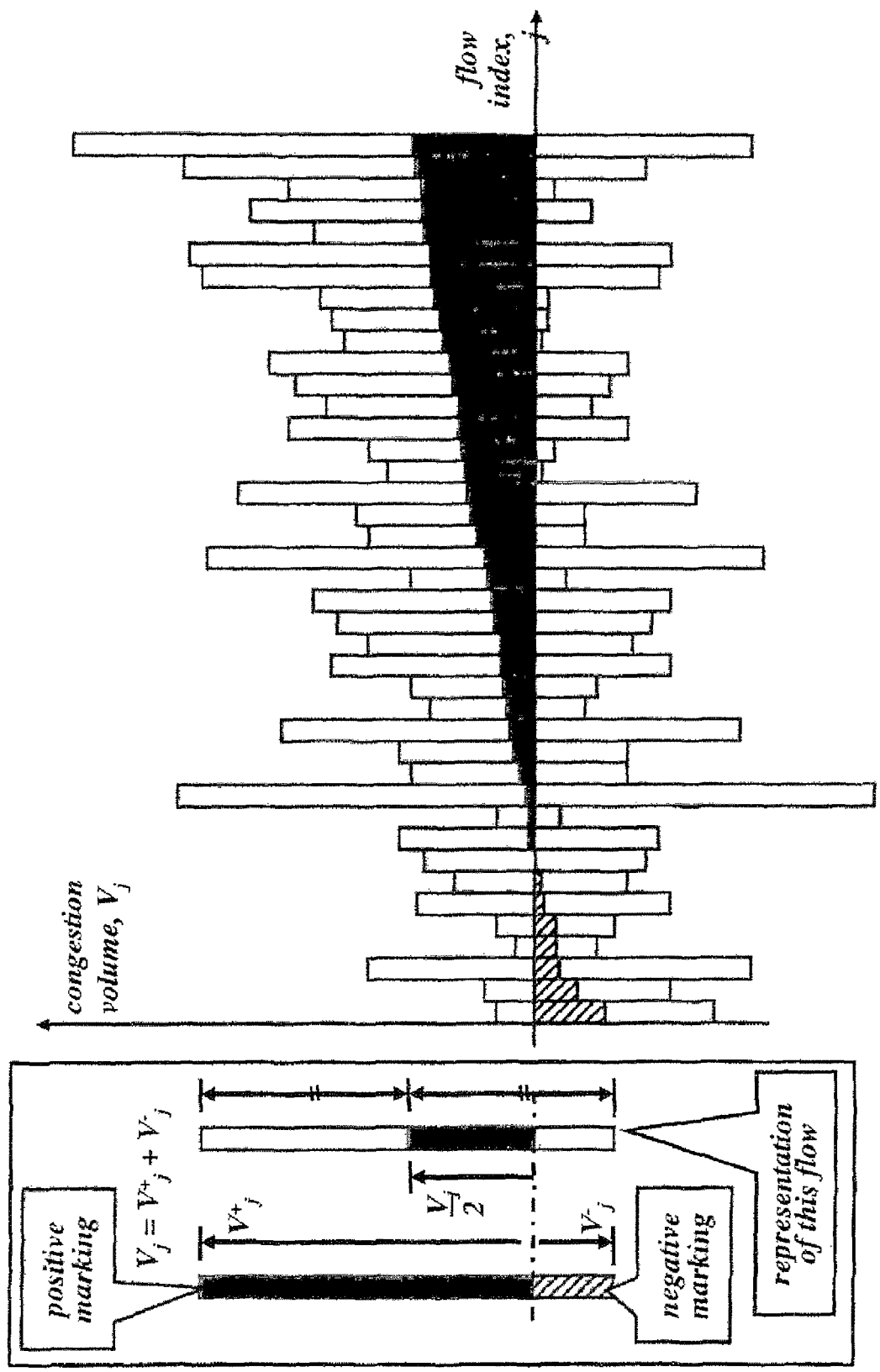
FIG. 2 is a graph illustrating a problem of bulk metering.

Consider a set of flows J, laid out along the horizontal axis in FIG. 2, ranked for visual convenience in order of downstream congestion volume. Each flow, index j, if metered on a per-flow basis would consist of some positively marked volume $V^+_j$ and some negatively marked $V^-_j$ (the latter variable being considered numerically negative). This notation is shown graphically for one of the flows on the left of the inset in the figure. The sum of these two volumes is the downstream congestion caused by each flow, $V_j = V^+_j + V^-_j$. As pointed out earlier, this scenario holds no matter what the precision of the header values, even if only three values of +1, 0 and −1 are available.

It may help to visualise this sum using each black shaded or striped area shown in each flow, which are actually all half the size of this sum. Each shaded area extends from the zero axis to the midpoint between the positive and negative volume measurements for each flow, as illustrated for the individual flow shown on the left of the inset in the figure, in which the accumulated positive markings of this individual flow are shown shaded black and the accumulated negative markings are shown striped. The height of any midpoint is always half the sum of the heights of the two points it lies between, which is why each shaded or striped area in the body of the diagram represents half the downstream congestion volume of each flow.

We want the sum of downstream congestion caused by all flows, except ones that are negative:

$$V_f = \Sigma_{\forall j \in J}(V^+_j + V^-_j)^+, \tag{2}$$

which is illustrated by twice the black shaded area shown above the axis. Note that the notation $X^+ = X$ if $X \geq 0$ or $X^+ = 0$ otherwise.

If we just meter the bulk congestion volumes of positive and negative packets in all flows crossing an interface over an accounting period, we will get the (incorrect) bulk metered volume of congestion, $$V_b = \Sigma_{\forall j \in J} V^+_j + V^-_j, \tag{3}$$

which is represented graphically by the black area above the axis minus the striped area below it, all doubled. The problem is how to exclude the striped area below the axis, but without accounting separately for every flow.

Assume for a moment that we can take a truly random sample of traffic comprising the subset of flows $S \subset J$. If the sample is small enough so that accounting separately for each flow is feasible, then we can measure downstream congestion both for the whole of the sample and solely for those flows that are positive. Then we can inflate the bulk downstream congestion volume measured without regard to flows by the ratio between the two measures found in the sample, as to get an estimate of downstream congestion excluding persistently negative flows.

$$E(V_f) = \alpha_S V_b$$

where $$\alpha_S = \frac{\sum_{\forall j \in S}(V^+_j + V^-_j)^+}{\sum_{\forall j \in S}(V^+_j + V^-_j)} \tag{4}$$

However, there is a further complication. Even if all sources were honest, a very small proportion of downstream congestion volume would be contained in flows that were negative overall. For instance, even if every source were honest and started every flow with a positive packet, some single datagram flows would be congestion marked, making them negative but no further datagrams would need to be sent in that flow. A similar situation could occur if a burst of congestion marking occurred at the end of a flow. Therefore, we actually want a deflated fraction of the above estimate to take account of the inflation factor $\alpha_H$ that would be found if we performed the same two measurements on a set H of purely honest flows.

$$E(V) = \alpha_S/\alpha_H V_b, \tag{5}$$

where $\alpha_H$ is defined for the set H of purely honest flows, just as $\alpha_S$ was defined for the set S in Eqn (4) above.

Congestion Volume Sampling

Taking a truly random sample for inflating the bulk congestion measure using the above formula is fraught with problems. A feature of the re-feedback framework is that each honest flow will tend to start with a positive balance, which it will maintain by balancing negative with slightly delayed positive throughout its duration, but sometimes there may not be a final balancing positive packet. This is because the network always subtracts from header values, while the source always tries to compensate by introducing positive packets, preferably anticipating likely subtraction by the network to ensure that a flow always remains positive overall. Therefore, flows cannot be picked by randomly selecting packets then looking for further packets with the same flow ID. This would tend to bias towards the end of flows, often missing off the positive bias at the start, while always including the negative bias at the end.

If we want to avoid per-flow state for all flows, we cannot randomly select from packets that start flows. Even though the re-feedback framework expects honest sources to identify the first packet of a new flow, we cannot rely on the first packet of every flow being identified by the source, because we are trying to also detect malicious flows. And it is only possible to know that a packet starts a new flow if it is compared against a list of all the currently active flows, which contravenes our original goal of not holding per-flow state.

We recommend a sampling mechanism that randomly picks a subset of the possible flow IDs, and detects all packets that match the subset over a period, before moving on to another subset. Then, it is necessary to take the average of all the inflation factors from each subset, weighted by the volume of traffic each subset matched.

Obviously, the flow IDs used by Internet hosts are not random, because IP addresses, protocol IDs and port numbers are unevenly allocated and unevenly used, particularly because the port number space includes a number of well-known ports. Also, it is quite likely that misbehaviour is concentrated into certain parts of the flow ID space. Therefore, over a measurement period, the aim would be for the samples to have collectively covered most of the possible address space.

Figure 3:
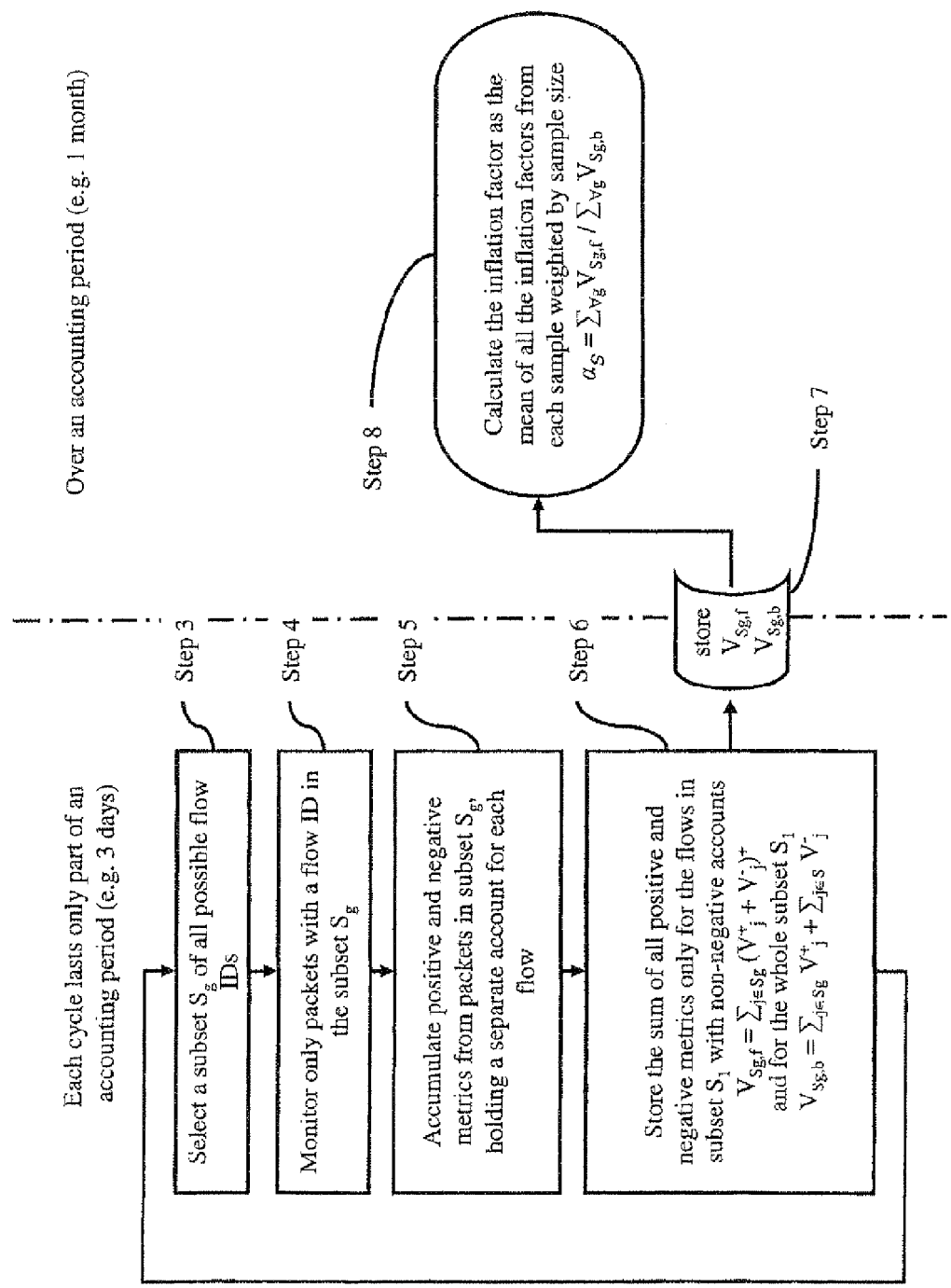
FIG. 3 is a flow-chart illustrating a congestion volume sampling process.
Figure 4:
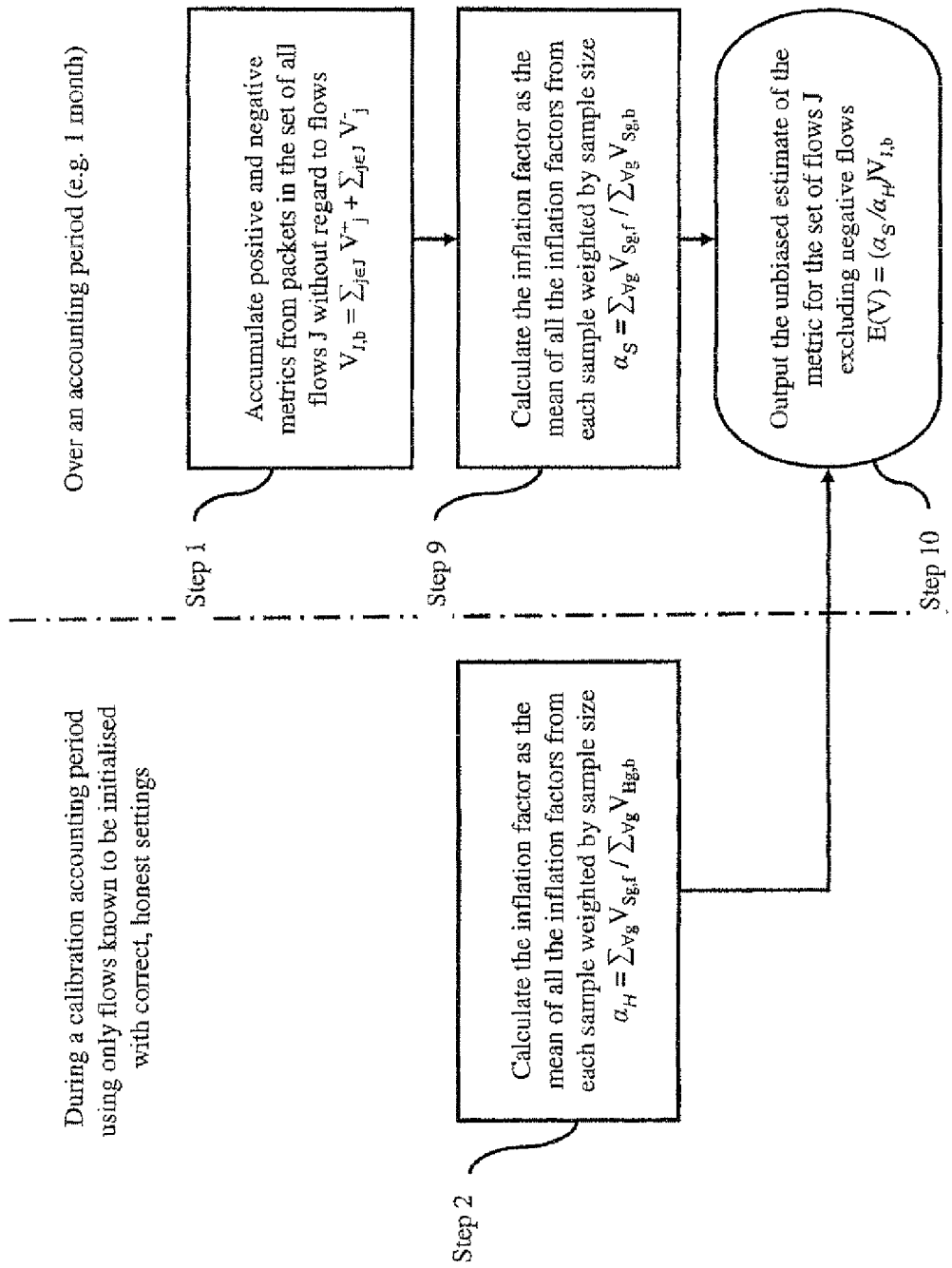
FIG. 4 is a flow-chart illustrating an unbiased congestion volume estimation process.

A preferred process for sampling traffic to determine an unbiased estimator of some downstream path characterisation metric is shown in FIGS. 3 and 4. FIG. 4 shows the whole process and FIG. 3 shows the sub-process within either step 2 or step 9 of the whole process.

Over the duration of an accounting period (for instance a month), the positive and negative path characterisation metrics in all packets are accumulated without regard to flows into the variable $V_{J,B}$ (step 1).

At some stage in the accounting period, a subset $S_1$ is selected from the set of all possible flow IDs (step 3). The subset is selected independently of the traffic actually being transmitted. That is, packets are not picked from actual traffic to determine the subset. Then, a meter monitors only packets with a flow ID in the subset $S_1$ (step 4). The meter accumulates positive and negative metrics from packets in subset $S_1$, holding a separate account of the sum for each flow (step 5). After a time shorter than the accounting period (say 3 days), the accounts for the flows in the subset $S_1$ excluding those flows with negative accounts are added together into the variable $V_{S1,f}$ and the accounts for all the flows in the subset $S_1$ irrespective of whether they are negative are added together into the variable $V_{S1,b}$ (step 6). These two variables are stored (step 7). Some time later, or perhaps immediately, the sub process of measuring a sample subset of flows is repeated with a new subset of flow IDs (step 3). At the end of an accounting period, all the measurements stored from each sample subset of measurements $V_{Sg,f}$ and $V_{Sg,b}$, for g=1, 2, 3, ... are taken to calculate the inflation factor as (step 8). This inflation factor is the mean of the inflation factors from each sample weighted by each sample size. That is $$\alpha_S = \Sigma_{\forall g} V_{Sg,f} / \Sigma_{\forall g} V_{Sg,b}.$$

To calibrate the system, which should be done regularly but infrequently, the same process as above (steps 3 to 8) should be used to calculate a calibrating inflation factor $\alpha_H$ (step 2), but the subsets of flows used $H_g$ should be known to be correct and honest. This may be achieved by simulating a real network, or by selecting only flow IDs between hosts known to be accredited, perhaps by random checks of their software before, during and after the calibration.

Finally, the inflation factor as calculated from samples randomly selected during the accounting period (steps 3 to 8, summarised in the overview diagram as step 9), and the calibration inflation factor $\alpha_H$ calculated from samples selected only from honest hosts during a calibration phase (steps 3 to 8 summarised as step 2) are used to give an unbiased estimate of the downstream path characterisation metric V (step 10) for the whole set of flows J, excluding negative flows, by inflating the bulk metric $V_{J,B}$ (taken at step 1) by the inflation factor $\alpha_S$ (calculated at step 9) divided by the calibration inflation factor $\alpha_H$ (calculated at step 2).

Even if all the flows are positive when accounted for as a whole, whenever a sampling technique only measures part of some flows, it will erroneously find some flows that appear to be negative overall. Therefore, the period over which a sample should be taken must be many times longer than the duration of flows that most traffic is in. Note that this is not the same as " ... the duration of most flows".

Agreement Between Neighbours

Often two neighbouring networks will need to meter some characteristic of the traffic passing between them as part of their contract, for instance, to check that they are keeping within a service level agreement or to determine usage charges.

Whenever such metering is necessary, to a certain extent the two parties must be able to trust each other or a third party. Even if they both meter the traffic, either party can simply lie about what their meter said in order to dispute the other's reading. However, one can only build trust in the other if the other party's reading consistently agrees with the one read privately.

If the contract between neighbours depends on a bulk measure metered continuously but inflated by a sampled measure, it is important that the party in control of the traffic cannot infer when sampling is occurring. Otherwise it can condition traffic to be well-behaved during sampling but behave badly otherwise.

It may be possible for both parties to hire a trusted third party to conduct the measurements independently of each of their interests. The third party might actually operate the meter physically secured against both interested parties, or it might produce a tamper-resistant meter for them to use that neither party believes can be influenced by the other.

If sampling is used but without a third party, given neither interested party will want to inform the other when or what they are sampling, it will not be possible to ensure that both parties measure the same data. The two parties can only build trust in each other if their two readings are close, or if they are neither persistently higher nor lower than the other. The two parties readings will only be close to each other if the sampling technique is strongly representative of the traffic in total.

In summary, the problem of neighbouring networks agreeing on a meter reading is not fundamentally different if sampling is used, but sampling does make it more difficult to build trust in each other's measurements if the resulting readings are unlikely to match closely.

The invention claimed is:

1. A method of determining a correction factor for use in monitoring network traffic traversing a network, said network traffic comprising a plurality of flows of data units, each of said flows having associated therewith a flow identifier from a set of flow identifiers, said data units having associated therewith a path characterisation metric; said method comprising the steps of:
selecting, using a network node, a subset of flow identifiers from said set of flow identifiers;
determining, in respect of flows having associated therewith flow identifiers from said selected subset of flow identifiers, which flows if any are of a first type and which flows if any are of a second type in dependence on an accumulated measure of the path characterisation metrics associated with data units of said flows, flows being determined to be of a first type in the event that their respective accumulated measure is within a first range, and flows being determined to be of a second type in the event that their respective accumulated measure is within a second range;
determining a first measure of the total of the accumulated path characterisation metrics associated with data units of said selected subset of flows; and
determining a second measure indicative of the proportion of said first measure contributed by flows of said second type; and
determining a correction factor in dependence on the first and second measures.

2. A method according to claim 1, wherein said path characterisation metric is a metric indicative of a characteristic of a downstream path.

3. A method according to claim 1, wherein said path characterisation metric is a metric indicative of a characteristic of an upstream path.

4. A method according to claim 1, wherein said path characterisation metric is a metric indicative of a characteristic of an end-to-end path.

5. A method according to claim 1, wherein said path characterisation metric is a metric indicative of congestion.

6. A method according to claim 1, wherein said path characterisation metric is a metric indicative of one or more of delay, number of hops, and capability of network elements.

7. A method according to claim 1, wherein said step of determining said second measure comprises determining said measure directly.

8. A method according to claim 1, wherein said step of determining said second measure comprises determining the proportion of said first measure contributed by flows of said first type, whereby to enable the proportion of said first measure contributed by flows of said second type to be derived therefrom.

9. A method according to claim 1, wherein said data units comprise data packets, frames or messages.

10. A method according to claim 1, wherein a flow is determined to be of a first type in the event that the respective accumulated measure is within a first range indicative that data units of said flow have associated therewith a path characterisation metric indicative of dishonest, malicious, accidental or uncontrolled behaviour, and a flow is determined to be of a second type in the event that the respective accumulated measure is within a second range outside said first range.

11. A method of controlling a capability of a network using a correction factor determined in accordance with claim 1, comprising controlling said capability in dependence on said correction factor.

12. A method according to claim 11, wherein said capability is selected from policing congestion control, routing, and providing differentiated quality of service.

13. Apparatus for controlling a capability of a network using a correction factor determined in accordance with claim 1, the apparatus comprising means for controlling said capability in dependence on said correction factor.

14. Apparatus according to claim 13, wherein said capability is selected from policing congestion control, routing, and the provision of differentiated quality of service.

15. A method according to claim 1, wherein the first type of flow is persistently irregular over a time period, and the second type of flow is not persistently irregular over the time period.

16. Apparatus for determining a correction factor for use in monitoring network traffic traversing a network, said network traffic comprising a plurality of flows of data units, each of said flows having associated therewith a flow identifier from a set of flow identifiers, said data units having associated therewith a path characterisation metric; said apparatus comprising:
means for selecting a subset of flow identifiers from said set of flow identifiers;
means for determining, in respect of flows having associated therewith flow identifiers from said selected subset of flow identifiers, which flows if any are of a first type and which flows if any are of a second type in dependence on an accumulated measure of the path characterisation metrics associated with data units of said flows, such that flows are determined to be of a first type in the event that their respective accumulated measure is within a first range, and flows are determined to be of a second type in the event that their respective accumulated measure is within a second range;
means for determining a first measure of the total of the accumulated path characterisation metrics associated with data units of said selected subset of flows; and
means for determining a second measure indicative of the proportion of said first measure contributed by flows of said second type; and
means for determining a correction factor in dependence on the first and second measures.

17. An apparatus according to claim 16, wherein the first type of flow is persistently irregular over a time period, and the second type of flow is not persistently irregular over the time period.

18. An apparatus according to claim 16, wherein said path characterisation metric is a metric indicative of congestion.

19. An apparatus according to claim 16, wherein said path characterisation metric is a metric indicative of one or more of delay, number of hops, and capability of network elements.

20. An apparatus according to claim 16, wherein said means for determining the second measure determines said second measure directly.

21. An apparatus according to claim 16, wherein said means for determining the second measure determines the proportion of said first measure contributed by flows of said first type, and derives the proportion of said first measure contributed by flows of said second type to be derived therefrom.

22. An apparatus according to claim 13, wherein a flow is determined to be of the first type in the event that the respective accumulated measure is within a first range indicative that data units of said flow have associated therewith a path characterisation metric indicative of dishonest, malicious, accidental or uncontrolled behaviour, and a flow is determined to be of the second type in the event that the respective accumulated measure is within a second range outside said first range.

23. A method of determining a correction factor for use in monitoring network traffic traversing a network, said network traffic comprising a plurality of flows of data units, each of said flows having associated therewith a flow identifier from a set of flow identifiers, said data units having associated therewith a path characterization metric; said method comprising the steps of:

selecting, using a computer, a partial subset of flow identifiers from said set of flow identifiers;

determining, in respect of flows having associated therewith flow identifiers from said selected subset of flow identifiers, which flows if any are of a first type and which flows if any are of a second type in dependence on an accumulated measure of the path characterization metrics associated with data units of said flows, flows being determined to be of a first type in the event that their respective accumulated measure is within a first range, and flows being determined to be of a second type in the event that their respective accumulated measure is within a second range;

determining a first measure of the total of the accumulated path characterization metrics associated with data units of said selected subset of flows;

determining a second measure indicative of the proportion of said first measure contributed by flows of said second type; and determining a correction factor in dependence on the first and second measures.

\* \* \* \* \*